United States Patent [19]
Van Leeuwen et al.

[11] Patent Number: 5,010,172
[45] Date of Patent: Apr. 23, 1991

[54] POLYMERIZATION OF CARBON MONOXIDE/OLEFIN WITH TERTIARY MONOPHOSPHINE OR SECONDARY MONOPHOSPHINE OXIDE

[75] Inventors: Petrus W. N. M. Van Leeuwen; Cornelis F. Roobeek, both of Amsterdam, Netherlands

[73] Assignee: Shell Oil Company, Houston, Tex.

[21] Appl. No.: 458,251

[22] Filed: Dec. 28, 1989

[30] Foreign Application Priority Data

Jan. 20, 1989 [NL] Netherlands .......................... 8900139

[51] Int. Cl.$^5$ ............................................. C08G 67/02
[52] U.S. Cl. ..................................... 528/392; 502/162
[58] Field of Search ......................................... 528/392

[56] References Cited

U.S. PATENT DOCUMENTS 3,694,412  9/1972  Nozaki .......................... 260/63 CQ

FOREIGN PATENT DOCUMENTS 121965  10/1984  European Pat. Off. .
257663   3/1988  European Pat. Off. .
283092   9/1988  European Pat. Off. .

Primary Examiner—Harold D. Anderson

[57] ABSTRACT

An improved process for the production of linear alternating polymer of carbon monoxide and at least one ethylenically unsaturated hydrocarbon comprises contacting the reactants in the presence of a catalyst composition formed from a palladium salt, a bidentate phosphorus ligand, and a tertiary monophosphine or a secondary phosphine oxide present in specified quantity.

16 Claims, No Drawings

POLYMERIZATION OF CARBON MONOXIDE/OLEFIN WITH TERTIARY MONOPHOSPHINE OR SECONDARY MONOPHOSPHINE OXIDE

FIELD OF THE INVENTION

The present invention relates to an improved process for the production of linear alternating polymer of carbon monoxide and at least one ethylenically unsaturated hydrocarbon. More particularly, the invention relates to a process for the production of such linear alternating polymers in the presence of a catalyst composition comprising a compound of palladium, a bidentate phosphorus ligand, and additionally a tertiary monophosphine or a secondary phosphine oxide, in specified quantity.

BACKGROUND OF THE INVENTION

The class of polymers of carbon monoxide and olefin(s) is well known in the art. Brubaker, U.S. Pat. No. 2,495,286, produced such polymers of relatively low carbon monoxide content in the presence of free radical initiators, e.g., peroxy compounds. G.B. No. 1,081,304 produced similar polymers of higher carbon monoxide content in the presence of an alkylphosphine complex of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently the class of linear alternating polymers of carbon monoxide and at least one ethylenically unsaturated hydrocarbon has become of greater interest in part because of the greater availability of the polymers. The more recent general processes for the production of these linear alternating polymers, now becoming known as polyketones or polyketone polymers, are illustrated by a number of published European patent applications including Nos. 121,965, 181,014, 213,671, and 257,663. These processes typically involve the use of a catalyst composition produced from a compound of certain Group VIII metals, particularly a palladium compound, the anion of a strong non-hydrohalogenic acid and a bidentate ligand of phosphorus, arsenic or antimony, particularly phosphorus. The addition of excess monophosphine to such catalyst compositions has been disclosed but the addition generally has had an adverse effect. In published European patent application 121,965 the activity of a polymerization catalyst decreased when 30 mols of monophosphine were added per mol of palladium. In published European Patent Application 283,092 it is shown that polymerization to form a linear alternating polymer stops when as little as 8 mols o: a monophosphine per mol of palladium is provided. It would be of advantage to provide a process for the production of linear alternating polymers of carbon monoxide and at least one ethylenically unsaturated hydrocarbon wherein the addition of certain monophosphines or phosphine oxides produces an increase in the activity of the polymerization catalyst composition.

SUMMARY OF THE INVENTION

The present invention provides an improved process for the production of linear alternating polymers of carbon monoxide and at least one ethylenically unsaturated hydrocarbon. More particularly, the present invention provides an improved process for the production of such linear alternating polymers by the use of a novel catalyst composition which is formed :rom certain palladium salts, a bidentate ligand of phosphorus and, in specified quantity, a tertiary monophosphine or a secondary phosphine oxide.

DESCRIPTION OF THE INVENTION

The polymer product of the process of the invention is a linear alternating polymer of carbon monoxide and at least one ethylenically unsaturated hydrocarbon containing substantially one molecule of carbon monoxide for each molecule of ethylenically unsaturated hydrocarbon. The ethylenically unsaturated hydrocarbons which are useful as precursors of the linear alternating polymer have up to 20 carbon atoms inclusive, preferably up to 10 carbon atoms inclusive, and are aliphatic such as ethylene and other α-olefins including propylene, 1-butene, isobutylene, 1-hexene, 1-octene, and 1-dodecene, or are arylaliphatic incorporating an aryl group as a substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene, and m-isopropylstyrene. Preferred linear alternating polymers are copolymers of carbon monoxide and ethylene or terpolymers of carbon monoxide, ethylene, and a second hydrocarbon of at least 3 carbon atoms, particularly an α-olefin such as propylene.

When the preferred terpolymers are produced by the process of the invention, there will be at least about 2 units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is thus represented by the repeating formula:

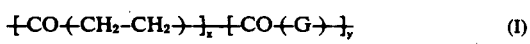

$$\text{—CO—(CH}_2\text{—CH}_2\text{)}_x\text{—(CO—(G)}_y \qquad (I)$$

wherein G is the moiety of the second ethylenically unsaturated hydrocarbon of at least 3 carbon atoms polymerized through the ethylenic unsaturation. The —CO—(CH₂—CH₂)— units and the —CO—(G)— units are found randomly throughout the polymer chain and the ratio of y:x is no more than about 0.5. When copolymers are produced according to the process of the invention there will be no second hydrocarbon present and the copolymers are represented by the above formula I wherein y is 0. When y is other than 0, i.e., terpolymers are produced, the preferred ratio of y:x will be from about 0.01 to about 0.1. The end groups or "caps" of the polymer chain will depend in part upon what materials were present during the production of the polymer and how and whether the polymer was purified. The precise properties of the polymers do not appear to depend upon the end groups to any considerable extent so that the polymers are fairly represented by the polymer chain as depicted above.

Of particular interest are the polyketone polymers of number average molecular weight from about 1,000 to about 200,000, particularly those of number average molecular weight from about 20,000 to about 90,000, as determined by gel permeation chromatography. The physical properties of the linear alternating polymers will depend in part on the molecular weight, whether the polymer is a copolymer or a terpolymer and, in the case of terpolymers, the nature of and the proportion of the second hydrocarbon present. Typical melting points for the polyketone polymers are from about 175° C. to about 300° C., more frequently from about 210° C to about 270° C. The polymers will have a limiting viscosity number (LVN), as measured in m-cresol at 60° C. in a standard capillary viscosity measuring device, from about 0.5 dl/g to about 10 dl/g, preferably from about 0.8 dl/g to about 4 dl/g.

The improved process of the invention comprises the contacting of the carbon monoxide and hydrocarbon reactants, under polymerization conditions, in the presence of a reaction diluent and the novel catalyst composition. The catalyst composition employed in the process of the invention is formed from a palladium salt of a strong acid, a bidentate ligand of phosphorus, and a monophosphine or secondary phosphine oxide. The palladium salt is the salt of an acid having a pKa below 2 (measured in water at 18° C.). Suitable palladium salts include salts of inorganic acids, e.g., palladium chloride, palladium bromide, and palladium perchlorate, as well as salts of organic acids including salts of organic carboxylic acids, e.g., palladium trifluoroacetate, palladium difluoroacetate and palladium dichloroacetate, and salts of organic sulfonic acids, e.g., palladium p-toluenesulfonate and palladium methanesulfonate. The palladium salt is suitably provided as such or in an alternate embodiment the palladium salt is provided in-situ from the salt of an acid having a pKa above 4, e.g., palladium acetate, together with from about 0.5 mol to about 50 mol, preferably from about 1 mol to about 24 mol, of an acid having a pKa below 2 for each mol of the palladium salt. For this purpose trifluoroacetic acid and p-toluenesulfonic acid are preferred.

The bidentate ligand of phosphorus has up to 50 carbon atoms and is a ligand of two phosphorus atoms, each containing two aryl substituents, connected by an organic linking group. The preferred bidentate ligands are represented by the formula:

(II)

wherein R independently is aryl of up to 10 carbon atoms inclusive and is hydrocarbyl containing only atoms of carbon and hydrogen or is substituted hydrocarbyl containing additional atoms in the form of polar substituents, particularly lower alkoxy substituents, at least one of which is substituted on a ring carbon atom ortho to the carbon atom through which R is connected to the phosphorus. Suitable hydrocarbon R groups include phenyl, naphthyl, tolyl and xylyl whereas illustrative substituted hydrocarbyl R groups are 2-methoxyphenyl, 2,4-diethoxyphenyl, 2,4,6-trimethoxyphenyl and 2-methoxy-5-propoxyphenyl. The R' groups of the bidentate ligand are the same or are different but preferred are those bidentate phosphorus ligands wherein the R groups are identical. The R' group is a divalent organic linking group of up to 10 carbon atoms inclusive and having from 2 to 4 carbon atoms in the phosphorus-phosphorus bridge. Preferred R' groups are polymethylene groups, i.e., groups of the structure —CH₂— wherein n is an integer from 2 to 4 inclusive. Particularly preferred as the R' linking group is the trimethylene or 1,3-propylene group. As is apparent, the scope of the bidentate phosphorus ligand is extensive but preferred ligands are 1,3-bis(diphenylphosphino)propane and 1,3-bis[di(2-methoxyphenyl)phosphino]propane. To the catalyst composition of the invention the bidentate phosphorus ligand is provided in a quantity of from about 0.5 mol to about 1.5 mol per mol of palladium salt, preferably in a quantity of from about 0.75 mol to about 1.25 mol per mol of palladium salt.

The third component from which the novel catalyst compositions of the invention are formed is a tertiary monophosphine or a secondary monophosphine oxide. In the embodiment of the catalyst composition where monophosphine has been provided, the tertiary monophosphine is represented by the formula

(R")₃P  (III)

wherein R" independently has up to 10 carbon atoms inclusive, is aliphatic or aromatic and is hydrocarbyl. Suitable aliphatic R" groups include methyl, ethyl, n-butyl, sec-butyl, octyl, and decyl while aromatic R" groups are represented by phenyl, tolyl, and naphthyl. The R" groups are the same or are different but preferably are the same. In general, aliphatic R" groups are preferred over aromatic R" groups in the tertiary monophosphine and tri(n-butyl)phosphine is particularly preferred. When the third component provided to the catalyst composition of the invention is a secondary phosphine oxide, the preferred secondary phosphine oxides are of the formula

(R")₂HPO  (IV)

wherein R" has the previously stated meaning. In the phosphine oxides, the preferred catalyst composition components are those wherein each R" is aromatic and particularly preferred is diphenylphosphine oxide. The tertiary monophosphine or the secondary phosphine oxide is employed in a quantity of from about 0.25 mol to about 2 mol per mol of palladium salt, preferably from about 0.75 mol to about 1.25 mol per mol of palladium salt.

It is useful on occasion to provide to the catalyst composition as an optional material an organic oxidant in order to enhance the activity of the catalyst compositions. Such organic oxidants include aliphatic nitrites such as butyl nitrite, aromatic nitro compounds such as nitrobenzene, and quinones, both 1,2-quinones and 1,4-quinones. The class of quinones is preferred as organic oxidant and benzoquinones, naphthoquinones and anthraquinones are satisfactory. Particularly preferred are the benzoquinones, especially 1,4-benzoquinone. As stated, the presence of an organic oxidant is optional and not required. The organic oxidant is provided in a quantity up to about 1,000 mol per mol of palladium compound. When present, the organic oxidant is preferably employed in a quantity of from about 25 mol to about 250 mol per mol of palladium compound.

The polymerization is conducted in the liquid phase in a reaction diluent in which the polymer product is at least substantially insoluble. Diluents such as the lower alkanols, e.g., methanol and ethanol, or the lower alkanones, e.g., acetone or methyl ethyl ketone, are satisfactory. The preferred reaction diluent is methanol. The molar ratio of carbon monoxide to ethylenically unsaturated hydrocarbon to be employed in the reaction mixture is variable. Molar ratios of from about 10:1 to about 1:10 are satisfactory. Ratios from about 5:1 to about 1:5 are preferred. Suitable quantities of catalyst composition are catalytic quantities and are sufficient to provide from about $1 \times 10^{-7}$ mol to about $1 \times 10^{-3}$ mol of palladium per mol of ethylenically unsaturated hydrocarbon, preferably from about $1 \times 10^{-6}$ mol to about $1 \times 10^{-4}$ mol of palladium per mol to ethylenically unsaturated hydrocarbon.

The reactants and catalyst composition are contacted under polymerization conditions. Typical polymerization conditions include a reaction temperature from about 50° C. to about 150° C., preferably from about 75° C. to about 125°C. The reaction pressure will be from about 20 bar to about 150 bar, preferably from about 30 bar to about 100 bar. The contact of the reactants and catalyst composition is maintained during reaction by conventional methods such as stirring or shaking and subsequent to reaction the polymerization is terminated as by cooling the reactor and releasing the pressure. The polymer product is recovered by well known procedures such as filtration or decantation. The polyketone polymer is used as recovered or is purified by contacting the polymer product with a solvent or extraction agent which is selective for catalyst residues.

The polyketone polymer is useful as an engineering thermoplastic and is processed into sheets, films, fibers, and shaped and molded articles by methods which are conventional for the processing of thermoplastics, e.g., extrusion, injection molding and thermoforming. The polymers are particularly useful in the production of containers for food and drink and in the production of both external and internal parts for automotive applications.

The invention is further illustrated by the following Comparative Examples (not of the invention) and the following Illustrative Embodiments which should not be construed as limiting the invention.

COMPARATIVE EXAMPLE I

A linear alternating copolymer of carbon monoxide and ethylene was prepared by charging to a 250 ml autoclave equipped with a stirrer a catalyst composition solution formed from 100 ml of methanol, and a complex of 0.1 mmol palladium dichloride and 0.1 mmol 1,3-bis[di(2-methoxyphenyl) phosphino]propane.

After removal of the air present in the autoclave by evacuation, an equimolar mixture of carbon monoxide and ethylene was introduced into the autoclave until a pressure of 40 bar was reached. The contents of the autoclave were heated to 110° C. and maintained at that temperature for 2 hours when the polymerization was terminated by cooling the autoclave and contents to room temperature and releasing the pressure. The polymer product was recovered by filtration, washed with methanol and dried under vacuum at room temperature. The yield of copolymer was 3.5 g, produced at a rate of 165 g copolymer/g Pd hour.

ILLUSTRATIVE EMBODIMENT I

A linear alternating copolymer of carbon monoxide and ethylene was prepared by a procedure substantially similar to that of Comparative Example I except that the catalyst solution additionally contained 0.1 mmol triphenylphosphine. The yield of copolymer was 7.5 g, produced at a rate of 350 g copolymer/g Pd hour.

COMPARATIVE EXAMPLE II

A linear alternating carbon monoxide/ethylene copolymer was prepared by a procedure substantially similar to that of Comparative Embodiment I except that the catalyst composition solution contained 0.1 mmol of 1,3-bis(diphenylphosphino)propane instead of 1,3-bis[di(2methoxyphenyl)phosphino]propane. A yield of 1.5 g of copolymer was obtained, produced at a rate of 70 g polymer/g Pd hour.

ILLUSTRATIVE EMBODIMENT II

A linear alternating copolymer of carbon monoxide and ethylene was produced by a procedure substantially similar to that of Comparative Example II, except :hat the catalyst composition additionally contained 0.1 mmol of diphenylphosphine oxide and the reaction time was 1 hour instead of 2 hours. The yield of copolymer was 2.5 g, produced at a rate of 235 g polymer/g Pd hour.

COMPARATIVE EXPERIMENT III

A linear alternating copolymer of carbon monoxide and ethylene was produced by a procedure substantially similar to that of Comparative Example I except that the catalyst composition contained a complex of 0.1 mmol palladium p-toluenesulfonate and 0.1 mmol 1,3-bis(diphenylphosphino)propane, the reaction temperature was 95° C. instead of 110° C. and the reaction time wa 30 minutes instead of 2 hours. The yield of copolymer was 6.5 g, produced at a rate of 1,220 g copolymer/g Pd hour.

ILLUSTRATIVE EMBODIMENT III

A linear alternating copolymer of carbon monoxide and ethylene was produced by a procedure substantially similar to that of Comparative Example III except that the catalyst composition solution additionally contained 0.1 mmol of triphenylphosphine. The yield of copolymer was 12 g, produced at a rate of 2,250 g copolymer/g Pd hour.

ILLUSTRATIVE EMBODIMENT IV

A linear alternating carbon monoxide/ethylene copolymer was produced by a procedure substantially similar to that of Comparative Example I, except that
(a) the catalyst composition comprised 100 ml methanol, 0.1 mmol palladium acetate, 0.1 mmol 1,3-bis(-diphenylphosphino)propane, 0.1 mmol tri(n-butyl)phosphine, and 2.0 mmol of trifluoroacetic acid,
(b) the reaction temperature was 90° C. instead of 110° C., and
(c) the reaction time was 30 minutes instead of 2 hours.

The yield of copolymer was 9.3 g, produced at a rate of 1,745 g copolymer/g Pd hour.

ILLUSTRATIVE EMBODIMENT V

A linear alternating copolymer of carbon monoxide and ethylene was produced by a procedure substantially similar to that of Comparative Example I except that
(a) the catalyst composition solution comprised 100 ml methanol, 0.1 mmol of palladium acetate, 0.1 mmol 1,3-bis(diphenylphosphino)propane, and 0.1 mmol of tri(n-butyl)phosphine oxide;
(b) the reaction temperature was 90° C. instead of 110° C., and
(c) the reaction time was 40 minutes instead of 2 hours.

The yield of copolymer was 13.3 g, produced at a rate of 1,870 g copolymer/g Pd hour.

What is claimed is:

1. A process for the production of linear alternating polymer of carbon monoxide and at least one ethylenically unsaturated hydrocarbon by contacting the carbon monoxide and ethylenically unsaturated hydrocarbon under polymerization conditions in the liquid phase in the presence a catalytic quantity of a catalyst composition formed from (a) a palladium salt of an acid having a pKa less than 2; (b) a bidentate ligand of phosphorus, and (c) a tertiary monophosphine or secondary monophosphine oxide provided in a quantity of from about 0.25 mol to about 2 mol per mol of palladium salt.

2. The process of claim 1 wherein the linear alternating polymer is represented by the repeating formula:

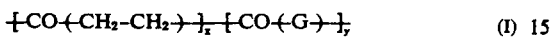  (I)

wherein G is the moiety of an ethylenically unsaturated hydrocarbon of at least 3 carbon atoms polymerized through the ethylenic unsaturation and the ratio of y:x is no more than about 0.5.

3. The process of claim 2 wherein the bidentate ligand of phosphorus is represented by the formula:

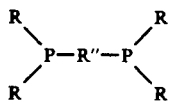

wherein R independently is aryl of up to 10 carbon atoms and R' is a divalent organic linking group of up to 10 carbon atoms inclusive.

4. The process of claim 3 wherein the tertiary monophosphine or secondary monophosphine oxide is a tertiary monophosphine of the formula:

wherein R'' independently is hydrocarbyl aliphatic or hydrocarbyl aromatic of up to 10 carbon atoms inclusive.

5. The process of claim 4 wherein the bidentate phosphorus ligand is 1,3-bis(diphenylphosphino)propane or 1,3-bis[di(2-methoxyphenyl)phosphino]propane present in a quantity from about 0.5 mol to about 1.5 mol per mol of palladium salt.

6. The process of claim 5 wherein the tertiary phosphine is tri(n-butyl)phosphine.

7. The process of claim 3 wherein the tertiary monophosphine or secondary monophosphine oxide is a secondary monophosphine oxide of the formula

wherein R'' independently is hydrocarbyl aliphatic or hydrocarbyl aromatic of up to 10 carbon atoms inclusive.

8. The process of claim 7 wherein the bidentate phosphorus ligand is 1,3-bis(diphenylphosphino)propane or 1,3-bis[di(2-methoxyphenyl)phosphino]propane present in a quantity from about 0.5 mol to about 1.5 mol per mol of palladium salt.

9. The process of claim 1 wherein the secondary phosphine oxide is diphenylphosphine oxide.

10. A process for the production of a linear alternating copolymer of carbon monoxide and ethylene by contacting the carbon monoxide and ethylene under polymerization conditions in the liquid phase in the presence of a catalytic quantity of a catalyst composition formed from (a) a palladium salt of an acid having a pKa less than 2, a bidentate ligand of phosphorus of the formula

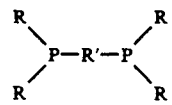

wherein R independently is aryl of up to 10 carbon atoms inclusive and R' is a polymethylene group of from 2 to 4 carbon atoms inclusive, and (c) from about 0.25 mol to about 2 mol per mol of palladium salt of a tertiary monophosphine of the formula

or a secondary monophosphine oxide of the formula

wherein R'' independently is hydrocarbyl aliphatic or hydrocarbyl aromatic of up to 10 carbon atoms.

11. The process of claim 10 wherein the palladium salt is provided in-situ from a palladium salt of an acid having a pKa over 4 and from about 0.5 mol to about 50 mol per mol of palladium salt of an acid having a pKa less than 2.

12. The process of claim 10 wherein the bidentate phosphorus ligand is 1,3-bis(diphenylphosphino)propane or 1,3-bis[di(2-methoxyphenyl)Phosphino]propane.

13. The process of claim 12 wherein the tertiary monophosphine or secondary monophosphine oxide is a tertiary monophosphine.

14. The process of claim 13 wherein the tertiary monophosphine is tri(n-butyl)phosphine.

15. The process of claim 12 wherein the tertiary monophosphine or secondary monophosphine oxide is a secondary monophosphine oxide.

16. The process of claim 15 wherein the secondary monophosphine oxide is diphenylphosphine oxide.

* * * * *